(12) United States Patent
Hill

(10) Patent No.: US 7,433,881 B1
(45) Date of Patent: Oct. 7, 2008

(54) SYSTEM AND METHOD FOR HANDLING MULTI-RESOLUTION GRAPHICS FILES

(75) Inventor: Charles E. Hill, Karnack, TX (US)

(73) Assignee: Charles E. Hill & Associates, Inc., Marshall, TX (US)

( * ) Notice: Subject to any disclaimer, the term of this patent is extended or adjusted under 35 U.S.C. 154(b) by 1159 days.

(21) Appl. No.: 10/007,731

(22) Filed: Nov. 8, 2001

Related U.S. Application Data

(63) Continuation-in-part of application No. 09/652,173, filed on Aug. 31, 2000.

(60) Provisional application No. 60/246,877, filed on Nov. 8, 2000.

(51) Int. Cl.
G06F 7/00 (2006.01)

(52) U.S. Cl. .............. 707/102; 707/100; 707/104.1

(58) Field of Classification Search .......... 707/1–104.1; 358/1.1; 345/1.13, 1.15, 418, 428, 440–441, 345/700, 764, 846; 709/200, 219, 217, 201, 709/203; 715/500, 500.1, 501.1, 513; 705/44, 705/1, 35; 386/46, 124

See application file for complete search history.

(56) References Cited

U.S. PATENT DOCUMENTS

| | | | | |
|---|---|---|---|---|
| 3,892,053 A | * | 7/1975 | Booher .................. 434/258 |
| 5,416,900 A | | 5/1995 | Blanchard et al. .......... 715/804 |
| 5,452,416 A | | 9/1995 | Hilton et al. |
| 5,517,605 A | * | 5/1996 | Wolf .................. 707/104.1 |
| 5,528,490 A | | 6/1996 | Hill .................. 717/168 |
| 5,712,995 A | | 1/1998 | Cohn |
| 5,740,801 A | * | 4/1998 | Branson ............... 600/407 |
| 5,748,931 A | | 5/1998 | Jones et al. |
| 5,838,316 A | | 11/1998 | Arruza ................. 715/810 |
| 5,845,288 A | | 12/1998 | Syeda-Mahmood ........ 707/102 |
| 5,850,552 A | | 12/1998 | Odani et al. ........... 717/156 |
| 5,870,725 A | * | 2/1999 | Bellinger et al. ............ 705/45 |
| 5,877,961 A | | 3/1999 | Moore ................. 700/180 |
| 5,895,455 A | * | 4/1999 | Bellinger et al. ............ 705/35 |
| 5,917,480 A | | 6/1999 | Tafoya et al. ........... 715/732 |
| 5,920,315 A | | 7/1999 | Santos-Gomez |
| 5,933,546 A | | 8/1999 | Stone |
| 5,946,417 A | | 8/1999 | Bonneau et al. |
| 5,960,448 A | * | 9/1999 | Reichek et al. .......... 715/526 |

(Continued)

OTHER PUBLICATIONS

Lotus 2001: Linda Rosier's photos, page from http://129.79.22.9/lotus2001/linda_rosier/index.html, printed Nov. 1, 2001.

(Continued)

Primary Examiner—Don Wong
Assistant Examiner—Linh Black
(74) Attorney, Agent, or Firm—Baker & Daniels LLP

(57) ABSTRACT

A method is provided for managing graphics files associated with a presentation. The method comprises the steps of storing a first graphics file corresponding to an image in a first graphics resolution in a database, generating a second graphics file in a second graphics resolution from the first graphics file, storing the second graphics file in the database, indexing the second graphics file to the first graphics file, receiving a presentation type for the image, determining an optimum graphics resolution for the image based on the presentation type, and selecting a graphics file from the database for use in the presentation based on the optimum graphics resolution.

35 Claims, 8 Drawing Sheets

U.S. PATENT DOCUMENTS

| | | | | |
|---|---|---|---|---|
| 5,970,471 | A | 10/1999 | Hill | 705/26 |
| 5,978,804 | A * | 11/1999 | Dietzman | 707/10 |
| 6,008,807 | A | 12/1999 | Bretschneider et al. | 715/732 |
| 6,012,071 | A | 1/2000 | Krishna et al. | |
| 6,035,323 | A * | 3/2000 | Narayen et al. | 709/201 |
| 6,041,143 | A | 3/2000 | Chui et al. | |
| 6,070,167 | A * | 5/2000 | Qian et al. | 707/102 |
| 6,173,338 | B1 | 1/2001 | Fukuta | |
| 6,240,414 | B1 | 5/2001 | Beizer et al. | 707/8 |
| 6,246,797 | B1 | 6/2001 | Castor et al. | |
| 6,298,173 | B1 | 10/2001 | Lopresti | |
| 6,317,141 | B1 | 11/2001 | Pavley et al. | 715/732 |
| 6,343,738 | B1 * | 2/2002 | Ogilvie | 235/381 |
| 6,386,985 | B1 * | 5/2002 | Rackham | 472/75 |
| 6,404,441 | B1 | 6/2002 | Chailleux | 715/704 |
| 6,408,301 | B1 * | 6/2002 | Patton et al. | 707/102 |
| 6,430,624 | B1 * | 8/2002 | Jamtgaard et al. | 709/246 |
| 6,445,834 | B1 * | 9/2002 | Rising, III | 382/305 |
| 6,551,357 | B1 | 4/2003 | Madduri | 715/512 |
| 6,611,291 | B1 | 8/2003 | Dow et al. | 348/333.01 |
| 6,636,837 | B1 * | 10/2003 | Nardozzi et al. | 705/27 |
| 7,127,674 | B1 * | 10/2006 | Carroll et al. | 715/209 |
| 2001/0047373 | A1 | 11/2001 | Jones et al. | |

OTHER PUBLICATIONS

The 60-Foot Solar Tower, 2 pages from http://physics.usc.edu/solar/, printed Aug. 31, 2001.

Mt. Wilson 60 Image Database, 2 pages from http://physics.usc.edu/solar/search_images/search_java.html, printed Nov. 5, 2001.

"Image Management Software", Sep. 11, 2000, http:V/www.shortcourses.com/book03/07.htm, pp. 1-25.

"Presenter's Guide for Auditoriums", Jul. 1, 1999, PlaceWare Conference Center., pp. 1-45.

* cited by examiner

SYSTEM AND METHOD FOR HANDLING MULTI-RESOLUTION GRAPHICS FILES

RELATED APPLICATIONS

This application is a continuation-in-part of U.S. patent application Ser. No. 09/652,173, filed Aug. 31, 2000, and claims the benefit of U.S. Provisional Patent Application Ser. No. 60/246,877, filed Nov. 8, 2000, both of which are incorporated herein by reference.

BACKGROUND AND SUMMARY OF THE INVENTION

Images, including photographs, drawings, pictures, graphs, charts, text, logos, symbols, and other visual content, or a combination thereof, can be stored on special film or paper (such as photographic film, or photographic paper), standard office paper, etc. or as digital files on magnetic disks, CD's, DVD's, flash memory, etc. Likewise, audio content, such as sounds, music, and spoken words, can be digitized and stored electronically, for example on CD's, DVD's, flash memory, etc. Similarly, audiovisual content, such as animations, videos, commercials, banner ads, music videos, recorded shows and movies, can also be captured and stored in digital format. For ease of discussion, the term "image" is used herein in many examples and drawings. It is understood that any and all types of visual and/or audio content may be processed or managed in a similar manner.

Today, more and more audio and visual content is stored in the form of digital files. These digital files are then used in computerized displays, performances, or presentations, or are electronically transferred to another medium for display, performance or presentation. When images are used in computerized presentations, for example, the required resolution is limited to the anticipated computer screen resolution. Today, the standard resolution is SVGA (800 pixels×600 pixels). This is a total of 480,000 pixels. In a high-resolution computer system, the resolution might be 1280 pixels by 1024 pixels for a total of 1,310,720 pixels.

By comparison, quality artwork in a magazine or print reproduction would require a resolution of at least 300 dots per inch (DPI). For an 8×10 inch print, this would require 2400 pixels×3000 pixels for a total of 7,200,000 pixels which is almost 7 times that required by a high resolution computer system. Of course larger prints such as 16×20 would require a corresponding increase in total pixels to 28,800,000. Increasing the number of pixels likewise increases the space required to store the image. Also, as the pixels may range from monochrome color, being either black or white (i.e., one bit field), or have a full range of color (i.e., 8-bit, 16-bit or even 32-bit fields), the corresponding image file size likewise increases with increased color depth.

In order to store an image and have it available for all possible uses in the future, the image must be stored in its highest anticipated resolution. Even at 28+ million pixels, this can be accomplished today. The problem is that today, the majority of uses for digital images are for computerized presentations. Although the presentation application could resize the image each time it is used, there are multiple disadvantages to a presentation containing several high-resolution images. One is that to transfer the presentation from one machine to another requires either a lot of bandwidth (e.g., a transfer across the Internet) or a lot of storage space (such as floppy disks, CD's or removable hard drives). For example, a presentation containing only high-resolution images can fill up an entire 650 Mb CD.

Another disadvantage is the excess data manipulation that the computer on which the presentation application is being run on is required to do. Even with today's high speed CPU's, a computer that must repeatedly resize high resolution images to present on a normal resolution computer screen will take several seconds per image before each is to be displayed.

Similar to digital images, the quality and usability of digital audiovisual content, such as animations, video clips, Internet movies and broadcasts, are related to the file format, resolution, compression ratio, or bit rate. For example, audiovisual content stored in the MPEG-1 format is generally regarded as "video quality" while audiovisual content stored in the MPEG-2 format is viewed as "TV" or "DVD" quality. The MPEG-4 provides a high quality, low bandwidth format suitable for Internet transmission.

Likewise, the quality and usability of digitized audio content is related to file format, sampling rate, number of bits used to encode the samples, or compression ratio. For example, the MP3 format maintains higher quality sound at a better compression ratio than other digital audio formats, so that MP3 files require less memory for storage and can use a smaller bandwidth for transmission. Thus, MP3 files are suitable for transmission over the Internet. Other digital audio formats that are currently available include WAV files (used in Microsoft products), MDI (for composing and editing electronic music), AU (used in Unix-based and Java applications) and Audio IFF (used in Apple products). In addition, many of today's music web sites provide both "hi fi" and "lo fi" options for digital audio files, depending on the speed of connection available for transmission.

Given the various quality levels and formats available for audio and/or visual content, it is also desirable to have a system for determining the appropriate quality level and/or format for the digitized content based on the intended use of the content.

In accordance with the present invention, a method is provided for managing graphics files associated with a presentation, the method comprising the steps of storing a first graphics file corresponding to an image in a first graphics resolution in a database, generating a second graphics file in a second graphics resolution from the first graphics file, storing the second graphics file in the database, indexing the second graphics file to the first graphics file, receiving a presentation type for the image, determining an optimum graphics resolution for the image based on the presentation type, and selecting from the first graphics resolution and the a second graphics resolution for use in the presentation based on the optimum graphics resolution.

The above method may further provide that the first graphics file has a first color resolution, the generating step further comprises the step of generating the second graphics file in a second color resolution, and the determining step further comprises the step of determining an optimum color resolution for the image based on the presentation type.

The above method may further provide that the first graphics file has a first graphics file format, the generating step further comprises the step of generating the second graphics file in a second graphics file format, and the determining step further comprises the step of determining an optimum graphics file format for the image based on the presentation type.

The above method may further comprise the step of associating in the database a plurality of graphics resolutions with a plurality of presentation types. The above method may further comprise the step of associating in the database a plurality of color resolutions with a plurality of presentation types. The above method may further comprise the step of associating in the database a plurality of graphic file formats with a plurality of presentation types. The above method may further provide that the presentation type is received from a user via an input device.

The above method may further provide that the determining step further comprises the steps of presenting a suggested presentation type to a user via a display device, and receiving a response to the suggested presentation type from the user via an input device.

The above method may further provide that the receiving step further comprises the step of receiving a desired color resolution for the image. The above method may further provide that the receiving step further comprises the step of receiving a desired graphics file format for the image. The above method may further provide that the delivering step further comprises the step of assigning a title to the corresponding graphics file. The above method may further provide that the retrieving step further comprises the steps of generating the corresponding graphics file if the corresponding graphics file is not found in the database, and storing the generated corresponding graphics file in the database.

Further in accordance with the present invention, a method is provided for managing an image associated with a presentation, the method comprising the steps of accessing a presentation containing at least one image, selecting an image from the presentation for a new use, receiving a desired graphics resolution for the selected image from a user, retrieving from a database a graphics file corresponding to the selected image and having the desired graphics resolution, and delivering the graphics file to the user.

Further in accordance with the present invention, a method is provided for selecting at least one of audio and visual content files from a database, each content file having an associated quality level, the method comprising the steps of receiving an intended use for the content file, determining an optimum quality level based on the intended use, and retrieving at least one content file having the optimum quality level from the database.

The above method may further provide that the quality level includes a resolution. The above method may further provide that the quality level includes a color depth. The above method may further provide that the quality level includes a compression indicator. The above method may further provide that the quality level includes a sampling rate. The above method may further provide that the determining step further comprises the step of determining an appropriate file format based on the intended use. The above method may further provide the step of delivering the at least one corresponding content file to a user.

Further in accordance with the present invention, a method is provided for generating an electronic presentation comprising the steps of storing a plurality of images in a database, each image being stored in a plurality of different formats, selecting an image from the plurality of images in the database for use in a presentation, selecting an optimum format of the selected image for use in the presentation, linking the selected image used in the presentation with the corresponding image stored in the database, and storing the presentation.

Further in accordance with the present invention, a method is provided for managing digital files associated with a presentation having at least one of audio and visual content, the method comprising the steps of storing a first digital file containing the at least one content in a first quality level in a database, receiving a presentation type for the presentation, determining a second quality level for the at least one content based on the presentation type, and generating a second digital file in the second quality level from the first digital file.

Additional features and advantages of the invention will become apparent to those skilled in the art upon consideration of the following detailed description of the illustrated embodiments exemplifying the best mode of carrying out the invention as presently perceived.

DETAILED DESCRIPTION OF THE DRAWINGS

Figure 1:
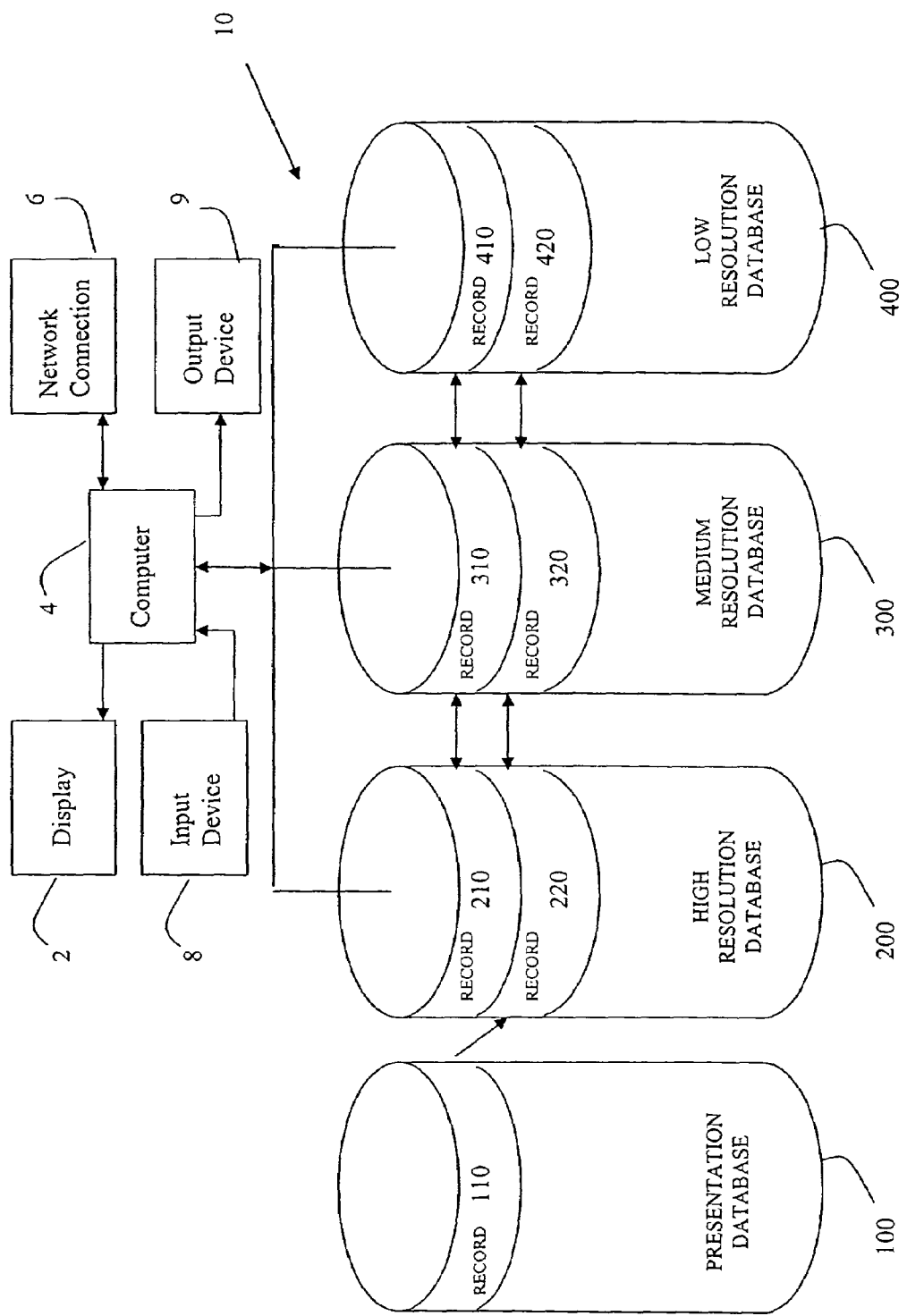
FIG. 1 depicts a linked image database, the highest resolution images being stored in database 200, and corresponding lower resolution images being stored in databases 300 and 400.

In accordance with the present invention, an image cataloging/presentation system that allows the user to selectively store images in a combination of low and high-resolution formats is provided. Image cataloging/presentation systems are available today designed for museums, private collectors, and photographers. In each of these systems, the primary purpose is to provide a convenient method for the user to catalog images and then access these images at some future time for use in a computer presentation. Generally, for a computerized presentation, only low-resolution images are required.

However, as discussed above, in each of these suggested applications, there may be a requirement to provide images in high-resolution format for purposes other than computerized presentations. Thus, in the present invention, the user selects an image for incorporation into the cataloging/presentation system having the highest anticipated resolution format. As the image is entered into the cataloging system, the image is automatically stored in its original high-resolution format, in a lower computer presentation format, and even in a lower resolution format, such as is generally recommended for Web applications. In an illustrated embodiment, the user is also prompted for which, if any, additional resolution formats the image is to be stored. Such user-selected graphics formats, include, for example, *.jpg, *.tiff, *.bmp, *.gif, etc.

As an example of how these additional images are used, suppose the user has developed a computer presentation. If there is interest from a publisher to use this presentation in a magazine article, the user returns to his/her original presentation, selects the images that he/she would like to include in the article, and the system then extracts the corresponding high resolution formats to be sent to the publisher. Another example is in the development of a Web page. The user searches the cataloged images and upon finding the appropriate image, the system then extracts the image in a Web application format (i.e. 2"×3" at 72 dpi, 144 pixels×216 pixels).

In the system of the present invention, the user catalogs his/her images one time in anticipation of future applications. As the images are used in future applications, they have already been converted to their most efficient resolution format. Therefore, the user's computer only handles the amount of data required by the application.

For ease of use, the system also packages the images for external applications, allowing the user to select the medium for transfer (i.e. Internet or other communication network, wireless data transfer, floppy disk, CD, DVD, removable hard drive). A file containing a list of the images and titles for each could also be included for the recipient of the images.

As discussed above, the present invention is directed to managing all types of presentation-related content, including audio, visual, and audiovisual content of various types. Accordingly, it will be appreciated that although references are to "image" or "images" herein, various types of audio and/or visual content may be handled in a similar manner.

As shown in the exemplary embodiment of FIG. 1, the present invention comprises a computer 4 (such as a microcomputer) coupled to a display device 2 (such as a computer monitor or other type of display screen) and having access to a database structure 10, a network connection 6 (such as the Internet, a local intranet, or other electronic or wireless network connection), an input device 8 (such as a keyboard, mouse, stylus, touch screen, scanner, microphone, digital camera, digital television, digital telephone, or other device for capturing information), and an output device 9 (such as a printer, computer memory, or a CD or DVD burner, or other storage media or other device for outputting information).

A presentation database 100 has stored within it a plurality of presentations, represented by database record 110, etc. Computer 4 and presentation database 100 are linked to a high-resolution database 200, a medium resolution database 300, and a low-resolution database 400. An example of such a system linking images and presentation data is described in U.S. patent application Ser. No. 09/652,173, which is hereby expressly incorporated herein by reference. All of the databases 100, 200, 300, and 400 are stored in computer memory. High-resolution database 200 has stored within it a plurality of images, represented by database records 210, 220, etc. Stored within medium resolution database 300 and low-resolution database 400 are corresponding medium resolution images, represented by database records 310, 320, etc. and corresponding low resolution images represented by database records 410, 420, etc. Thus, should the user select the high resolution image represented in high resolution database 200 by record 220, the user is also provided with medium resolution image 320 and low resolution image 420. Of course, it will be readily apparent to one of ordinary skill in the art that the high-resolution database 200, the medium resolution database 300 and the low-resolution database 400 may all be one database structure, or may be several different databases distributed on one computer or over a distributed network. In addition, the high, medium, and low resolution content files may be organized and indexed according to other database structures as may be desirable to improve searching, storage, and/or retrieval efficiency.

Figure 2:
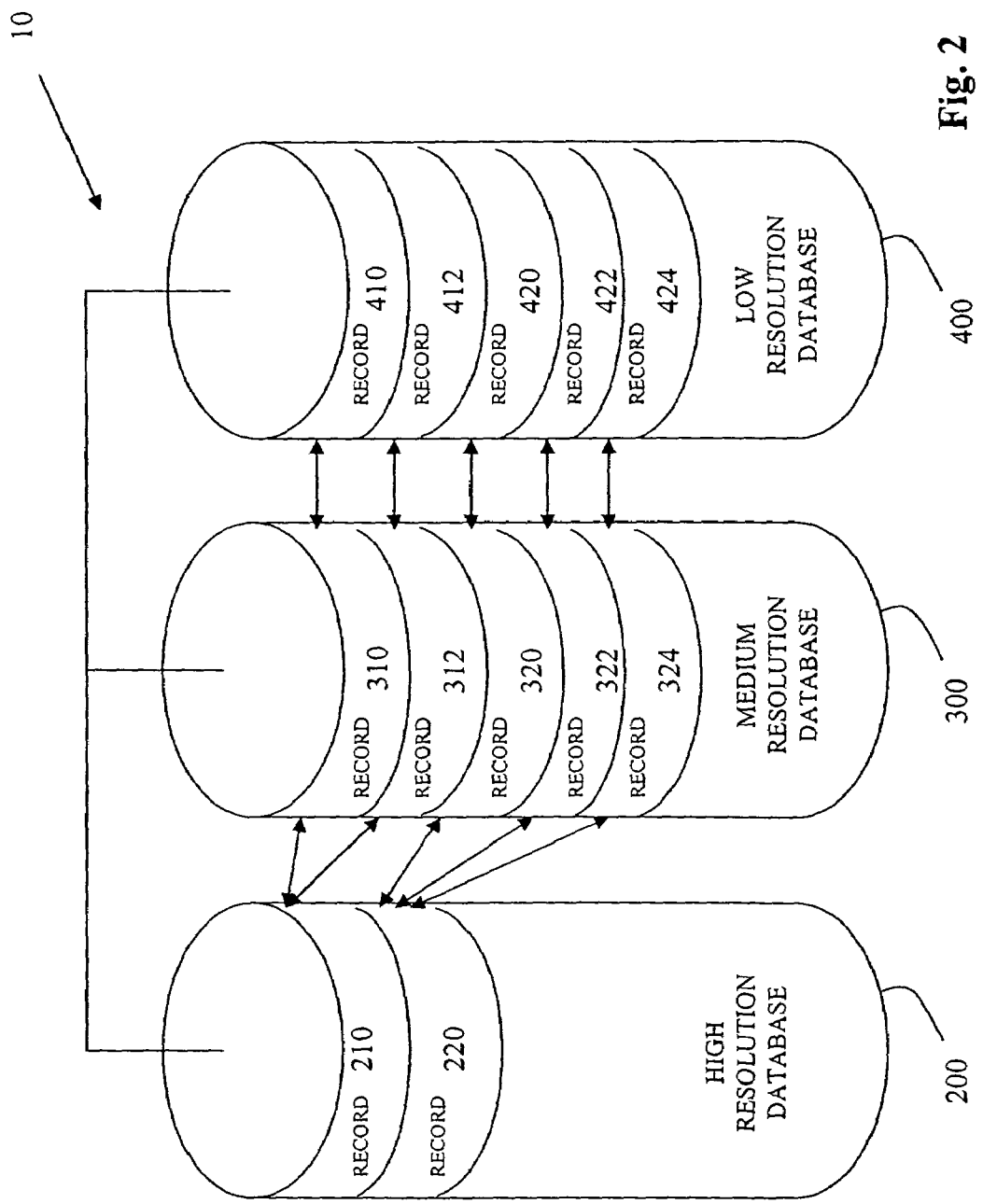
FIG. 2 depicts another linked image database, the highest resolution images being stored in database 200, and corresponding lower resolution images being stored in databases 300 and 400, the corresponding lower resolution images stored in various file formats.

FIG. 2 depicts another exemplary embodiment of the database structure 10 of the present invention, wherein the medium resolution database 300 and the low-resolution database 400 have medium resolution images and low-resolution images stored in multiple formats. It is understood, but not shown in FIG. 2, that presentation database 100 is linked to the high, medium, and low resolution databases 200, 300 and 400. When the user selects high-resolution image 210, medium resolution images 310 and 312, and low-resolution images 410 and 412 are accessible. In this exemplary embodiment, images 310 and 410 are stored in a *.jpg format, and images 312 and 412 are stored in a *.tiff format. Likewise, when a user selects high-resolution image 220, medium resolution images 320, 322, 324, and low-resolution images 420, 422 and 424 are accessible. In the exemplary embodiment of the invention shown in FIG. 2, images 320 and 420 are in *.jpg format, images 322 and 422 are in *.tiff format, and images 324 and 424 are in *.bmp format. Of course, one skilled in the art will note that the image formats in the medium resolution database 300 and low-resolution database 400 need not correspond. Thus, a user may store a medium resolution image in several file formats (such as *.jpg, *.tiff and *.bmp), and store the corresponding low resolution image in only one file format (such as *.bmp). Also, one of ordinary skill in the art will recognize that various color depths may also be selected, e.g., 1-bit, 8-bit, 16-bit, etc. Further, it will be appreciated by those skilled in the art that the database index structures may be designed to permit high and/or medium resolution files to be made accessible when a user selects a low resolution file, and for high and/or low resolution files to be made available when a user selects a medium resolution file.

Figure 3:
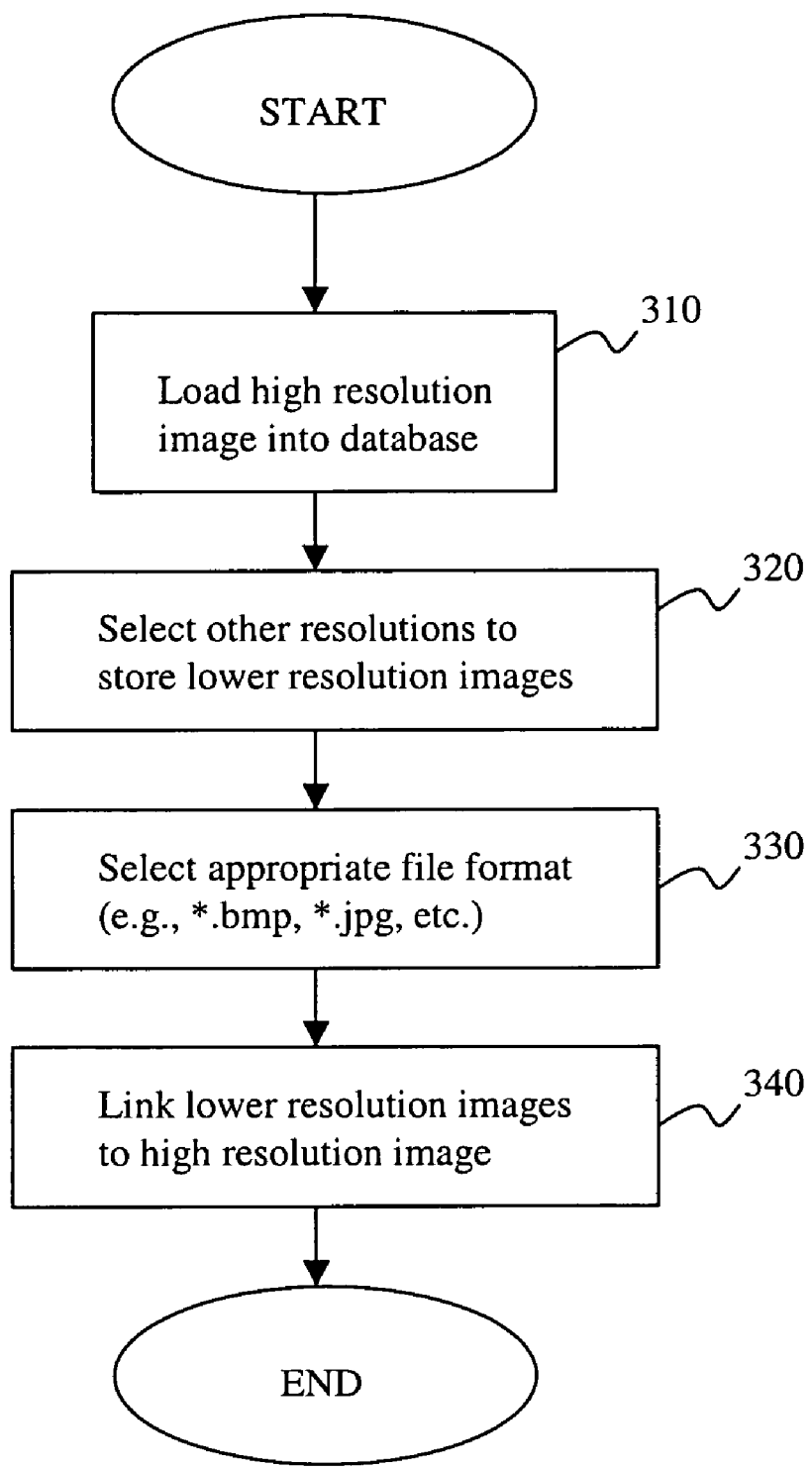
FIG. 3 is a flow diagram depicting the procedure used to store the high-resolution image.

FIG. 3 is a flow diagram describing the process used to store a high-resolution image. In step 310, the user loads the high-resolution image into the high-resolution database 200. In step 320, the user selects other resolutions to store lower resolution images in medium resolution database 300 and low-resolution database 400. In step 330, the user selects appropriate file formats used to store the medium resolution images in the medium resolution database 300, and low-resolution images to store in the low resolution database 400. Thus, the user may select to store several medium resolution images in *.bmp and *.jpg formats in the medium resolution database 300, and select only a *.bmp format for storage in the low-resolution database 400. In step 340, the lower resolution images are linked to the high-resolution image stored in the high-resolution database 200. Thus, when the user selects the high-resolution image, the user is presented with other medium and low-resolution images for selection.

Figure 4:
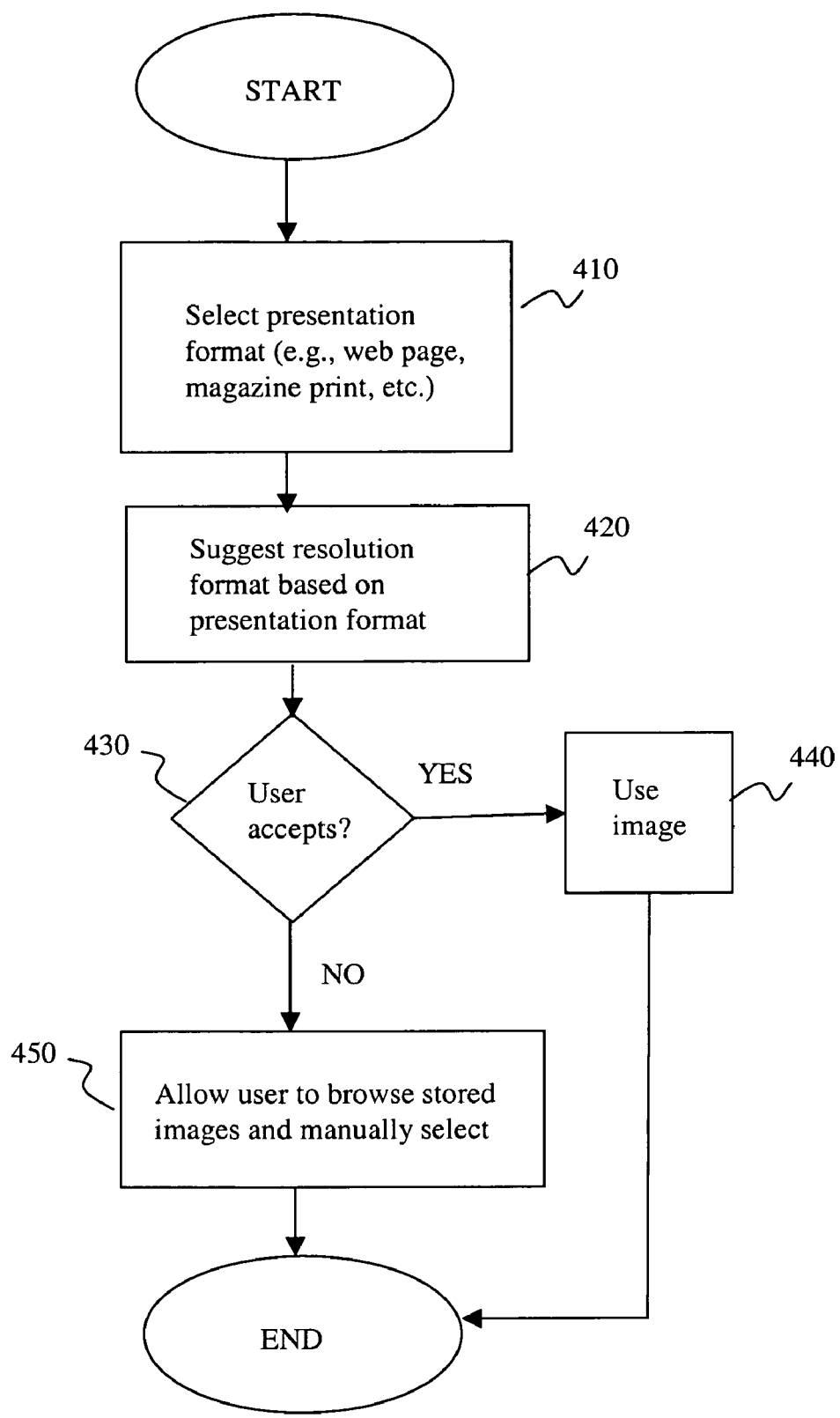
FIG. 4 is a flow diagram depicting the procedure of retrieving an image from the database so that the image may be used in a presentation.

FIG. 4 is a flow diagram depicting the procedure for retrieving an image from the database so that the image may be used in the computer presentation. In step 410, the user selects a presentation format. The presentation format may be a web page, which requires a low-resolution image, or it may be a magazine article, in which the image required must have a higher resolution. Depending upon the user's selection, the software routine of step 420 presents the user with a suggested resolution format. Thus, if the user is building a web page, the computer may present the user with several low-resolution files of the corresponding high-resolution image, as illustrated in step 420. If the user accepts the suggested resolution format at block 430, step 440 is executed by the computer and the selected images are used in the corresponding presentation. However, if the user does not accept the suggested resolution format at block 430, step 450 allows the user to browse the stored images in all databases and manually select the image the user prefers.

Figure 5:
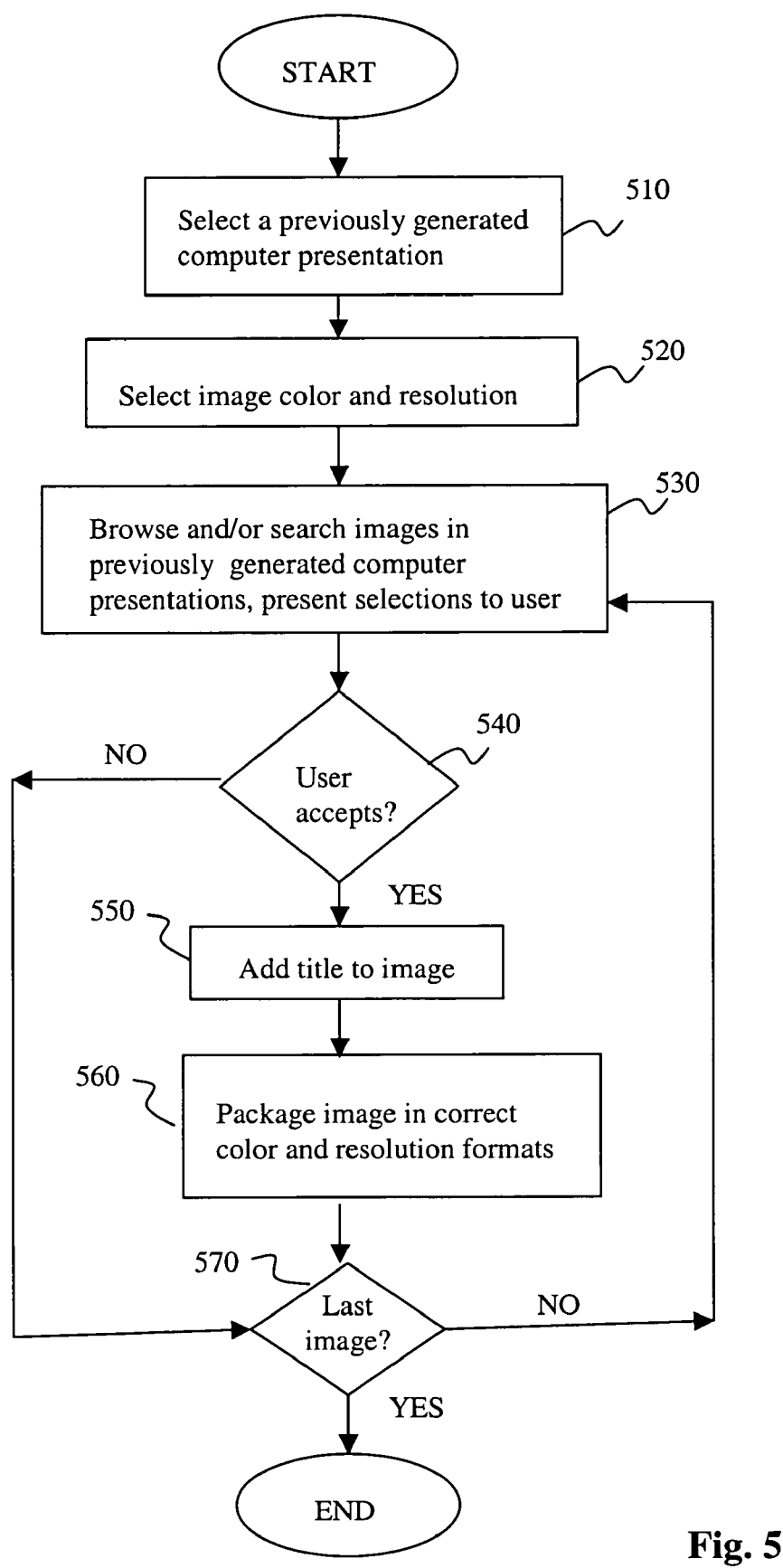
FIG. 5 is a flow diagram depicting the procedure of retrieving an image by first accessing a previously generated computer presentation to select the image, which is then retrieved from the database, and storing the image in a desired color resolution and format.

FIG. 5 is a flow diagram depicting the procedure of retrieving an image by first accessing a previously generated computer presentation to select the image, which is then retrieved from the database, and storing the image in a desired color resolution and format. This process is used to convert a data intensive presentation (e.g., images in 1024×768 high color resolution) into a less data intensive presentation (e.g., images in a lower color resolution and stored in a *.jpg format). An example of one such computer generated presentation system used to generate a presentation is disclosed in U.S. patent application Ser. No. 09/652,173. In step 510, the user selects a previously generated computer presentation that contains one or more images. In step 520, the user selects the image resolution desired. Additionally, the user may also select the color resolution desired. In step 530, the previously generated computer presentation is searched for images, and the images are presented to the user. If the user accepts the images in step 540, the images are provided a title in step 550, and are packaged in the color and resolution formats selected in step 520 (i.e., the image is retrieved from either the medium resolution database 300 or low resolution database 400, or, if not found, saved as a separate image in either the medium resolution database 300 or low resolution database 400). If this is the last image, the process is complete. If further images remain, the user is returned to the browsing step at block 530.

Figure 6:
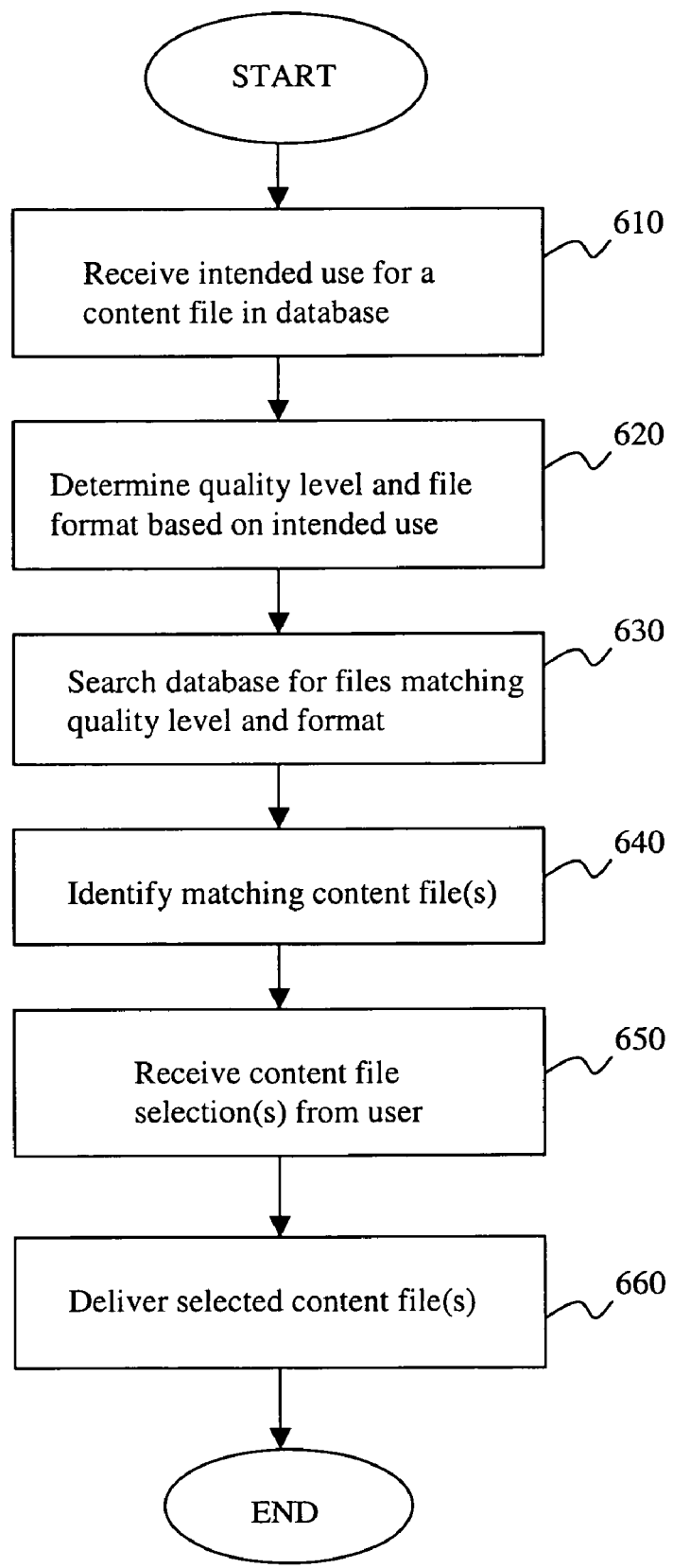
FIG. 6 is a flow diagram depicting the procedure of automatically determining the appropriate audio and/or visual content file based on an intended use for the content, and retrieving the appropriate file.

FIG. 6 is a flow diagram depicting a method of selecting an audio and/or visual content file from a database based on an intended use for the content in the file. In step 610, the intended use for the content is obtained, e.g., from a user via an input device (the input device being, for example, a keyboard, mouse, stylus, touch screen, microphone, etc.). The intended use may be, for example, online presentation, slide projector presentation, printed materials (e.g., handouts, printed publication), web site, CD-ROM/DVD stored recording, flash memory stored recording, Internet transmission (via cable modem), Internet transmission (via ISDN), local intranet transmission, wireless transmission, radio broadcast, television broadcast, etc.

In step 620, the intended use is matched through programming logic with a corresponding quality level, and, if necessary, file format, for the desired content file. For example, if the intended use of an audio file is Internet transmission via cable modem, the corresponding quality level could be "hi fi" and the file format, MP3.

In step 630, the database of audio and/or visual content files is searched for a matching content file having the desired quality level and file format. One of ordinary skill in the art will be aware of myriad techniques that may be used to perform the database searching. Any matching content files found are identified, i.e., presented to the user via a display device, at step 640, for the user to review. Not shown in FIG. 6, but within the scope of the invention, is a procedure for creating the desired content file from an existing content file, if a content file having the desired quality level and file format is not already found in the database. If such file is created "on the fly", it may be stored in the database or stored in cache memory.

At step 650, the user selects the desired file(s) from the list of retrieved files matching the intended use criteria. Not shown, but within the scope of the invention, is a process whereby the user may repeat steps 610, 620, 630, and 640 if none of the files identified in step 640 are acceptable to the user. Once the user's selections have been received at step 650, the selected files are packaged and delivered to the user at step 660. At step 660, the user may specify a delivery means, such as by printer, email, file transfer, save to disk, or other suitable delivery method.

Figure 7:
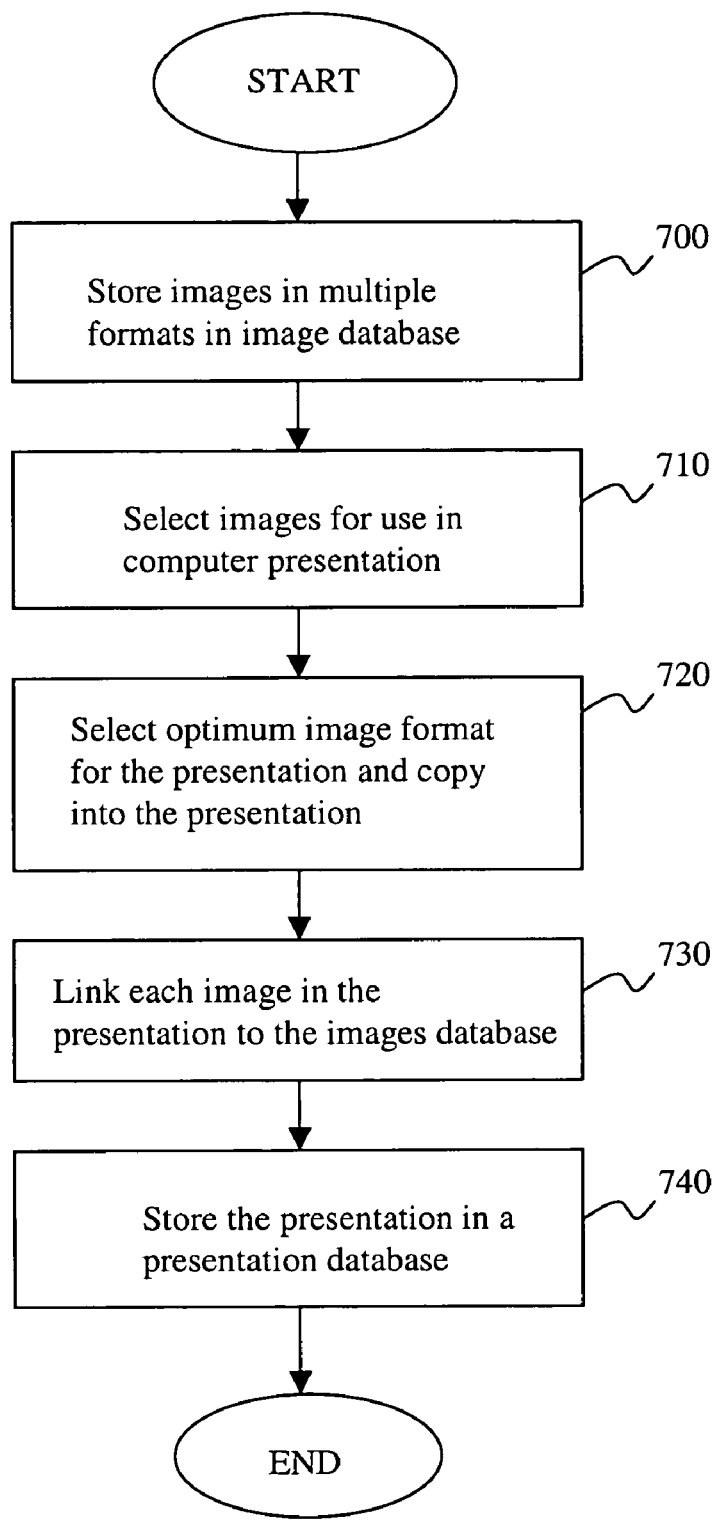
FIG. 7 is a flow diagram depicting the procedure of storing images from a presentation in an image database.

FIG. 7 shows a procedure for storing images from a presentation in an image database in accordance with the present invention. At step 700, one or more images are converted into multiple formats or resolutions, and stored in an image database, such as is depicted in FIGS. 1 & 2. At step 710, a user selects from the image database certain desired images for use in a computer presentation. At step 720, the optimum image format for the user's presentation is determined through programming logic based on, for example, the presentation type. As shown in FIG. 4, the optimum image format is presented to the user via the display device, and the user accepts or rejects the suggestion. If the user accepts the format, then the image in the selected format is copied into the user's presentation. Alternatively, the step of presenting the optimum image format to the user for confirmation is eliminated, such that the image in the optimum format is automatically copied into the presentation. Each image in the presentation is then linked to the images database at step 730, such that the images database may be searched for any image located in the presentation. At step 740, the presentation is stored in the presentation database 100, shown in FIG. 1.

Figure 8:
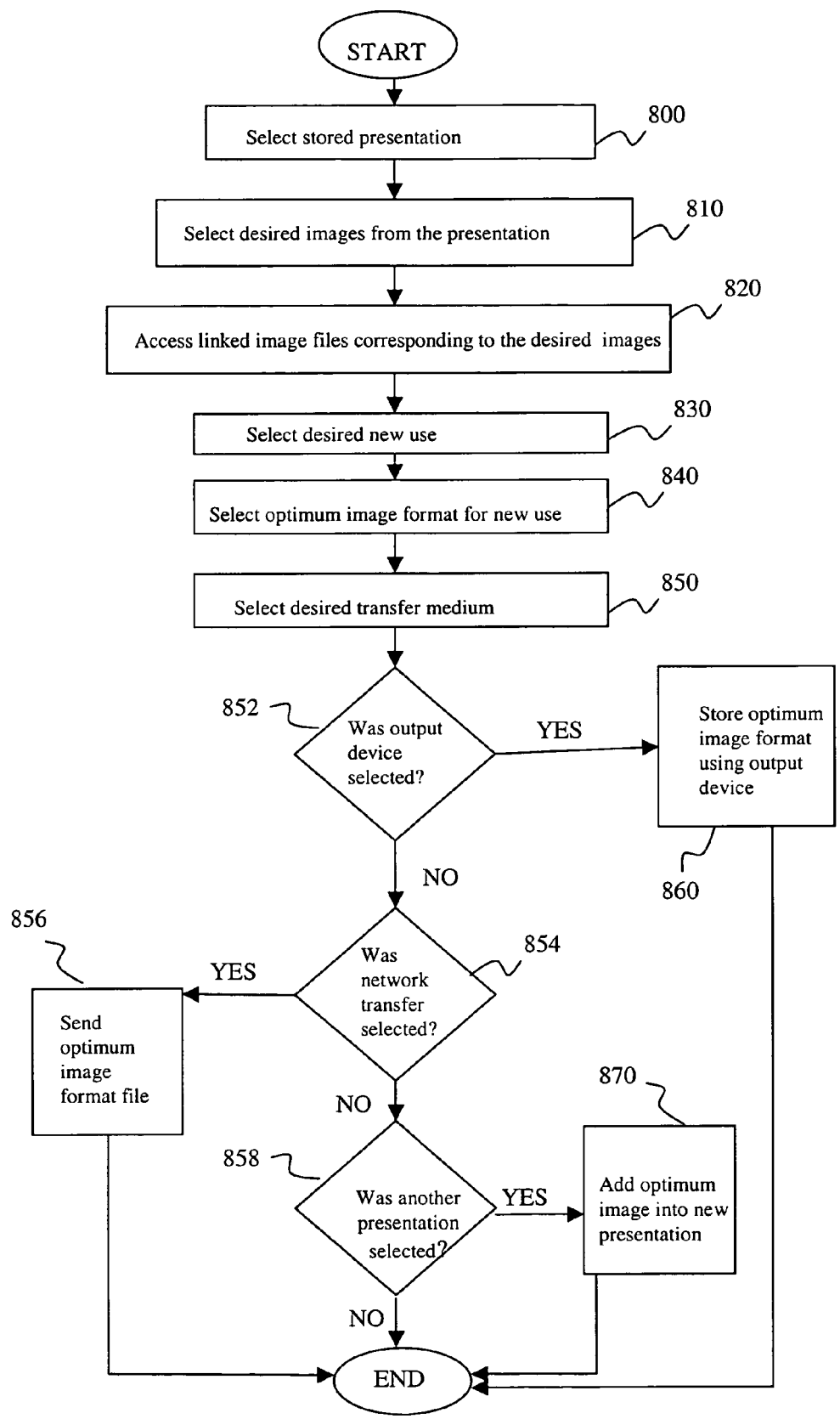
FIG. 8 is a flow diagram depicting the procedure of selecting images from a presentation for a new use.

FIG. 8 shows a procedure of selecting images from a presentation for a new use, in accordance with the present invention. At step 800, a presentation is selected by the user, e.g., from the presentation database 100. At step 810, the user reviews the presentation and selects a desired image for incorporation into a new presentation or other use. The desired image has already been linked to an image in the image database, for example, by the process shown in FIG. 7. Therefore, once the desired image is selected in the presentation, the corresponding image files in the image database are accessed and made available for review by the user. At step 830, the user selects or identifies the desired new use for the image, for example, printed publication, web site, etc. At step 840, the optimum image format corresponding to the selected new use is selected, either by the user or automatically by the computer system. At step 850, a desired transfer medium (such as Internet transfer, disk storage, wireless transfer, etc.) for delivery of the selected image is selected by the user. In steps 830, 840, and 850, the user may be presented with a menu, listing, dialog box, or series of check boxes, for example, representing the various options for new use, image format, transfer medium, from which he or she may select the desired option.

At steps 852 and 854, the system performs an activity based on the desired transfer medium selected at step 850. At step 852, the system determines whether an output device (such as a CD or DVD) was selected at block 850, and if so, stores the image in the optimum image format using the selected output device. If a network transfer is the selected transfer medium, the system so determines at step 854 and, at step 856, sends the optimum image format file via the network. At step 858, the system checks to see if another presentation has been selected by the user for insertion of the optimum image. If another presentation has been selected, the optimum image is inserted into the new presentation at step 870.

Although the invention has been described in detail with reference to certain exemplary embodiments, variations and modifications exist with the scope and spirit of the present invention as defined and described in the following claims.

What is claimed is:

1. A method for generating an electronic presentation, the method comprising the steps of:

storing a plurality of images in a database, each image being stored in a plurality of different formats, each format having the same image content, selecting an image from the plurality of images in the database for use in a presentation, selecting an optimum format of the selected image for use in the presentation based on a presentation type, linking the selected image used in the presentation with the corresponding image stored in the database, and storing the presentation.

2. The method of claim 1, wherein the step of selecting an optimum format includes providing a display of a plurality of different formats.

3. The method of claim 1, further comprising the steps of:

selecting an image from a stored presentation which is desired for a new use, identifying the stored image in the database corresponding to the selected image in the presentation, and selecting an optimum image format for the new use.

4. The method of claim 3, wherein the step of selecting an optimum image format includes the steps of selecting a new use from a plurality of possible uses, and determining the optimum format based on the new use.

5. The method of claim 2, further comprising the step of:

selecting a medium of transfer for the optimum format for the new use.

6. The method of claim 5, wherein the step of selecting a medium of transfer includes the step of selecting a medium of transfer from a plurality of possible transfer media.

7. The method of claim 5, wherein the medium of transfer is one of a communications network, a wireless network, a computer disk, a CD, a DVD, a flash memory card, a printer, and a removable hard drive.

8. The method of claim 3, wherein the identifying step is performed automatically based on an identification of a type of the new use.

9. The method of claim 3, wherein the identifying step is performed manually by a user input.

10. The method of claim 1, wherein the presentation is an electronic slide show.

11. The method of claim 2, wherein the plurality of different formats include different resolutions, different colors, and different compression indicators.

12. The method of claim 3, wherein the step of selecting an optimum image format is performed automatically based on an identification of a type of the new use.

13. A method for generating an electronic presentation, the method comprising the steps of:

storing a plurality of audio files in a database, each audio file being stored in a plurality of different formats, selecting an audio file from the plurality of audio files in the database for use in a presentation, selecting an optimum format of the selected audio file for use in the presentation, linking the selected audio file used in the presentation with the corresponding audio file stored in the database, and storing the presentation.

14. The method of claim 13, wherein the step of selecting an optimum format includes providing a display of a plurality of different formats.

15. The method of claim 13, further comprising the steps of:

selecting an audio file from a stored presentation which is desired for a new use, identifying the stored audio file in the database corresponding to the selected audio file in the presentation, and selecting an optimum audio file format for the new use.

16. The method of claim 15, wherein the step of selecting an optimum audio file format includes the steps of providing a menu of a plurality of possible uses, selecting a new use from the plurality of possible uses, and determining the optimum format based on the new use.

17. The method of claim 15, further comprising the step of:

selecting a medium of transfer for the optimum format for the new use.

18. The method of claim 17, wherein the step of selecting a medium of transfer includes the steps of providing a menu of a plurality of possible transfer media and selecting a medium of transfer from the menu.

19. The method of claim 17, wherein the medium of transfer is one of a communications network, a wireless network, a computer disk, a CD, a DVD, a flash memory card, a printer, and a removable hard drive.

20. The method of claim 15, wherein the identifying step is performed automatically based on an identification of a type of the new use.

21. The method of claim 15, wherein the identifying step is performed manually by a user input.

22. The method of claim 13, wherein the presentation is an electronic slide show.

23. The method of claim 13, wherein the plurality of different formats include at least one of different file formats, sampling rates, number of bits used to encode the samples, and compression ratio.

24. A method for generating an electronic presentation, the method comprising the steps of:

storing a plurality of image files and audio files in a database, each image file and audio file being stored in a plurality of different formats, selecting one of an image file and an audio file from the plurality of image files and audio files in the database for use in a presentation, selecting an optimum format of the selected file for use in the presentation, linking the selected file used in the presentation with the corresponding file stored in the database, and storing the presentation.

25. The method of claim 24, wherein the step of selecting an optimum format includes providing a display of a plurality of different formats.

26. The method of claim 24, further comprising the steps of:

selecting one of an image file and an audio file from a stored presentation which is desired for a new use, identifying the stored file in the database corresponding to the selected file in the presentation, and selecting an optimum file format for the new use.

27. The method of claim 26, wherein the step of selecting an optimum file format includes the steps of providing a menu of a plurality of possible uses, selecting a new use from the plurality of possible uses, and determining the optimum file format based on the new use.

28. The method of claim 25, further comprising the step of:

selecting a medium of transfer for the optimum file format for the new use.

29. The method of claim 28, wherein the step of selecting a medium of transfer includes the steps of providing a menu of a plurality of possible transfer media and selecting a medium of transfer from the menu.

30. The method of claim 28, wherein the medium of transfer is one of a communications network, a wireless network, a computer disk, a CD, a DVD, a flash memory card, a printer, and a removable hard drive.

31. The method of claim 26, wherein the identifying step is performed automatically based on an identification of a type of the new use.

32. The method of claim 26, wherein the identifying step is performed manually by a user input.

33. The method of claim 24, wherein the presentation is an electronic slide show.

34. The method of claim 24, wherein the plurality of different formats for the image files include at least one of different resolutions, different colors, and different compression indicators.

35. The method of claim 24, wherein the plurality of different formats for the audio files include at least one of different file formats, sampling rates, number of bits used to encode the samples, and compression ratio.

* * * * *